Aug. 18, 1953     F. AUTENRIETH     2,649,056
ALIMENTARY FOOD PRODUCT MACHINE
Filed May 7, 1949     9 Sheets-Sheet 1
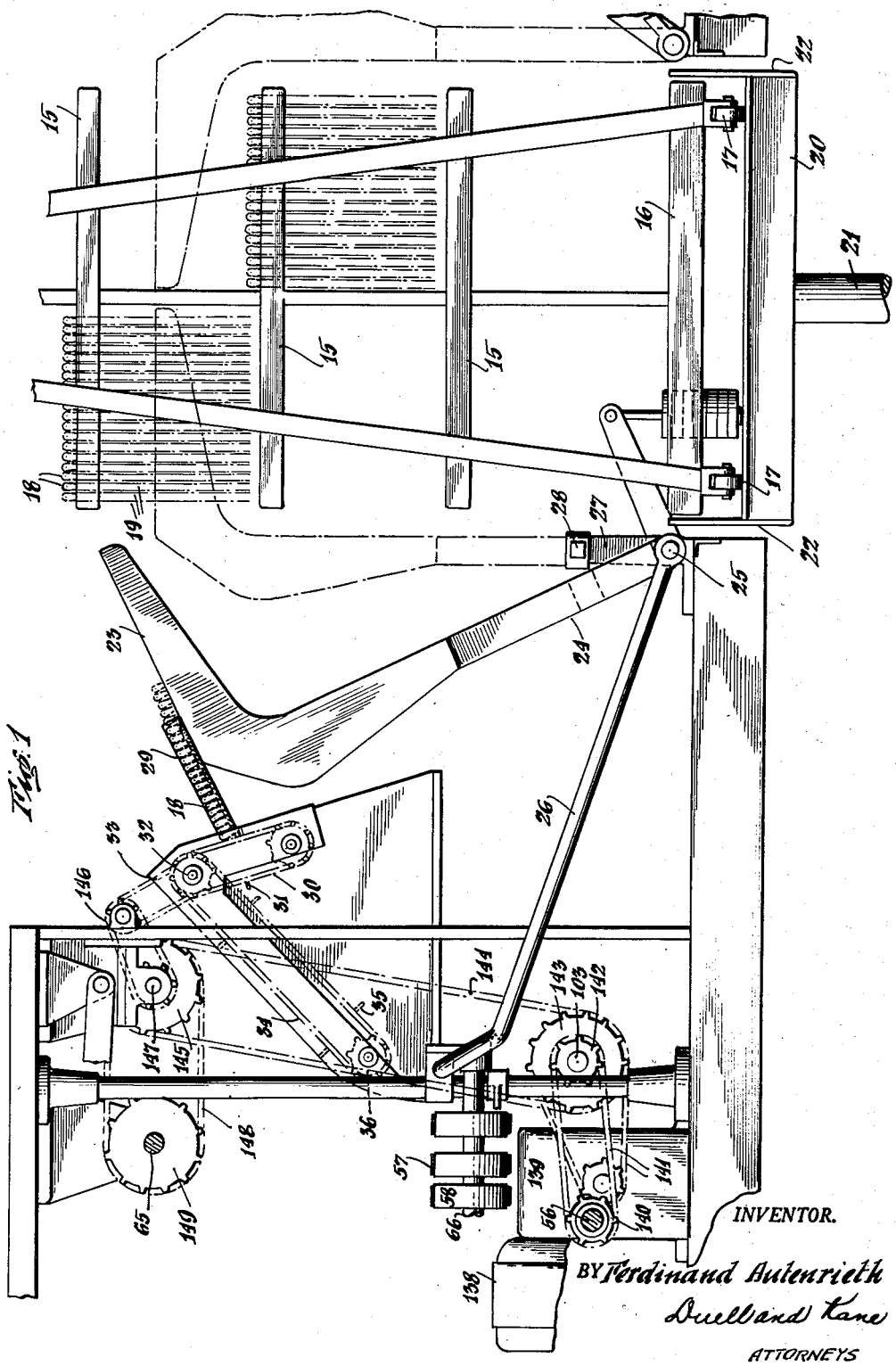
INVENTOR.
BY Ferdinand Autenrieth
Duell and Kane
ATTORNEYS

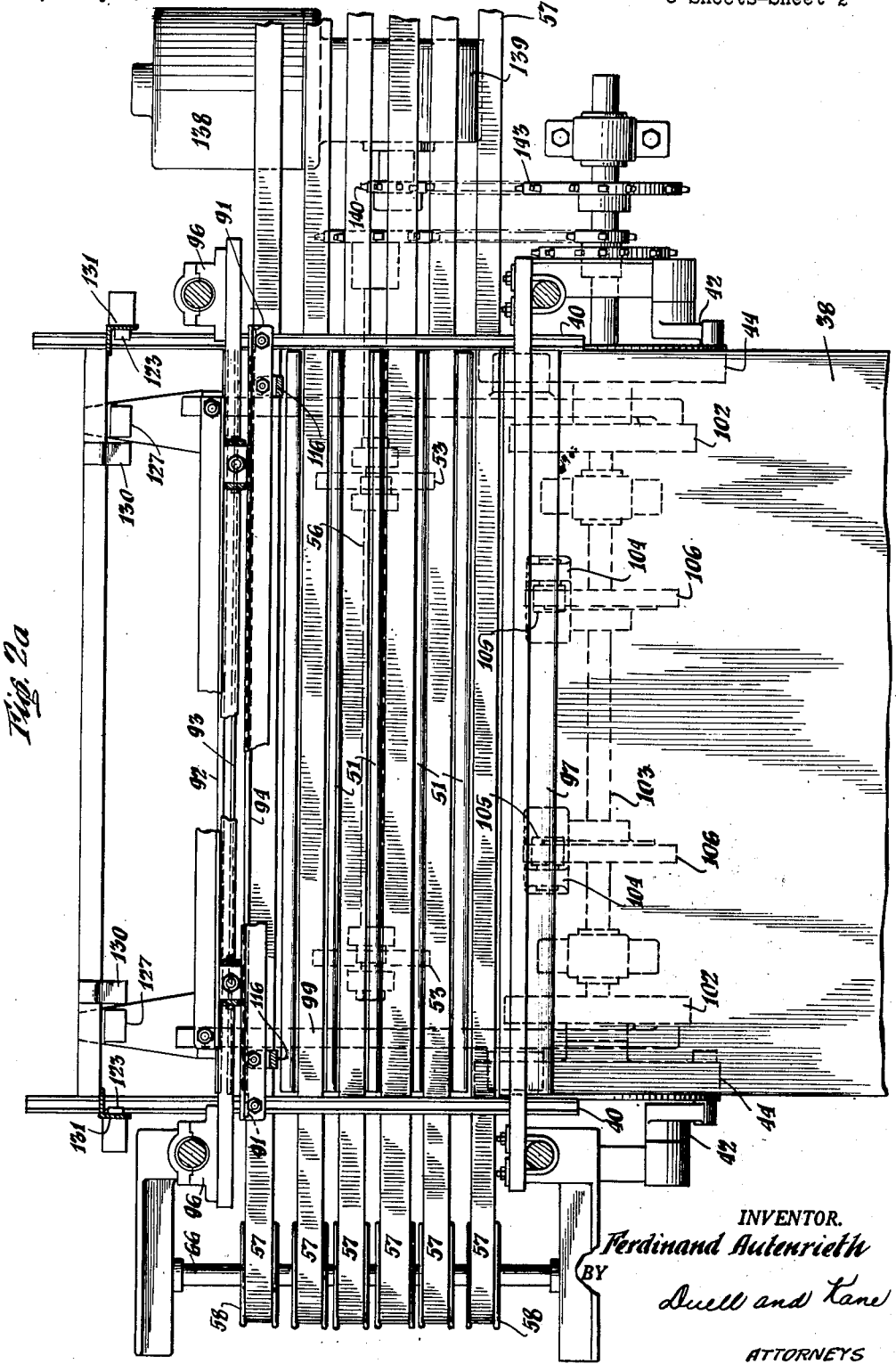

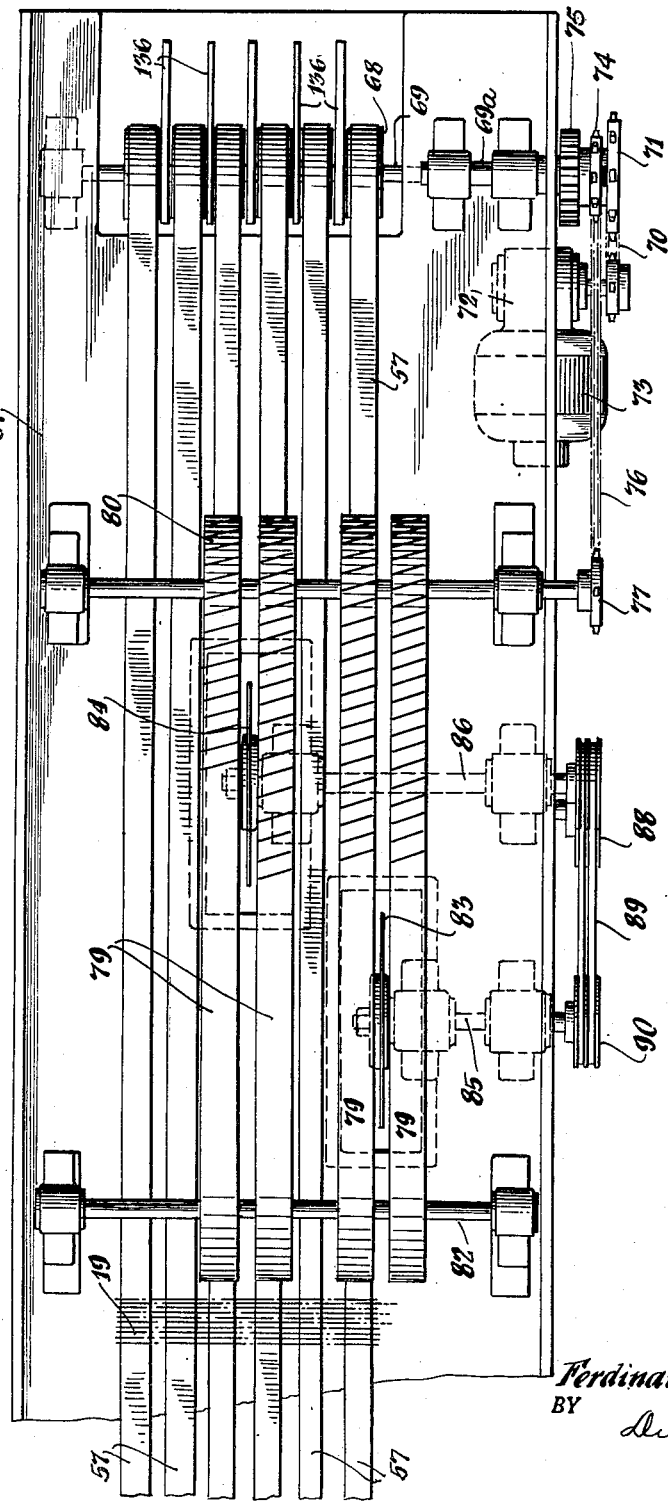

Aug. 18, 1953  F. AUTENRIETH  2,649,056
ALIMENTARY FOOD PRODUCT MACHINE
Filed May 7, 1949  9 Sheets-Sheet 4
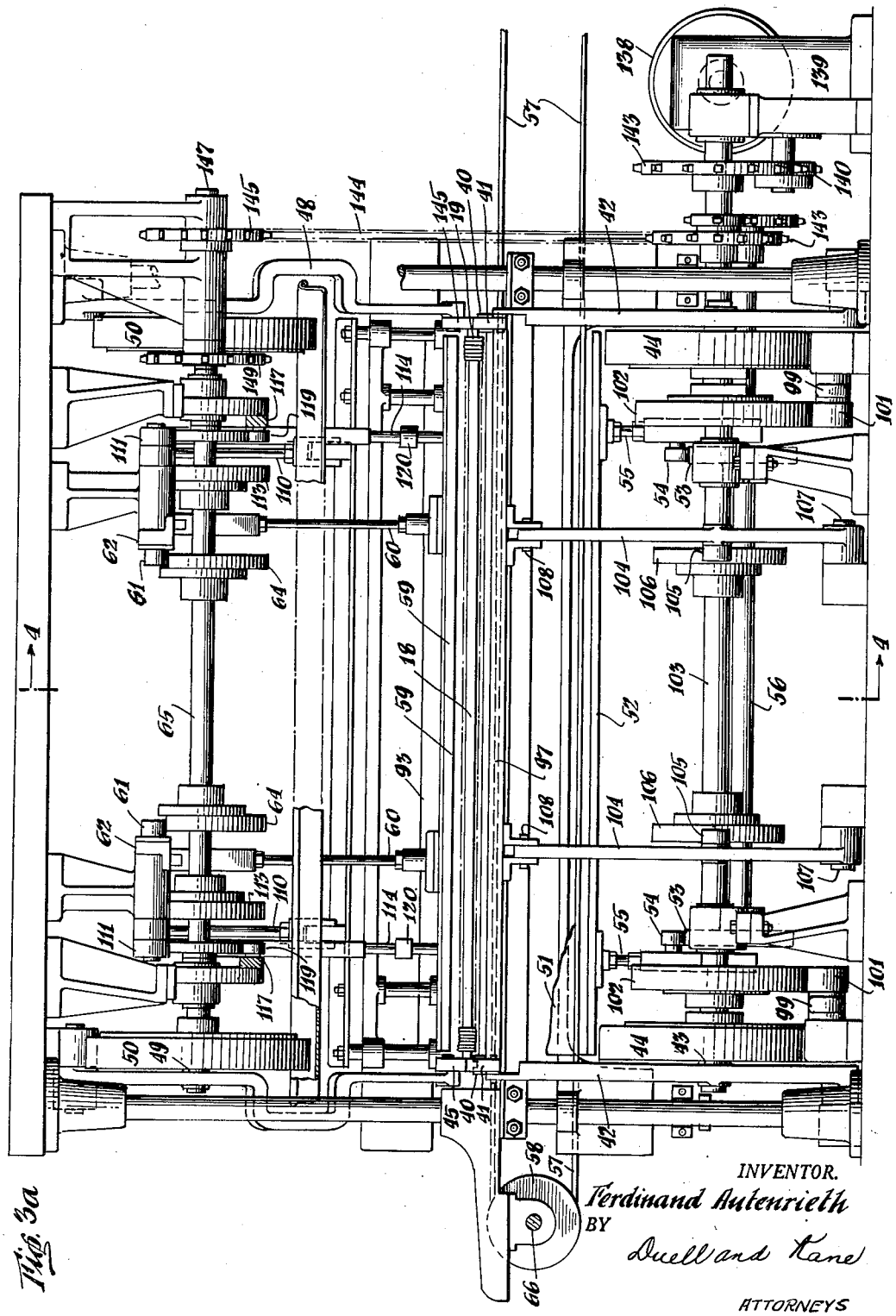
INVENTOR.
Ferdinand Autenrieth
BY
Duell and Kane
ATTORNEYS

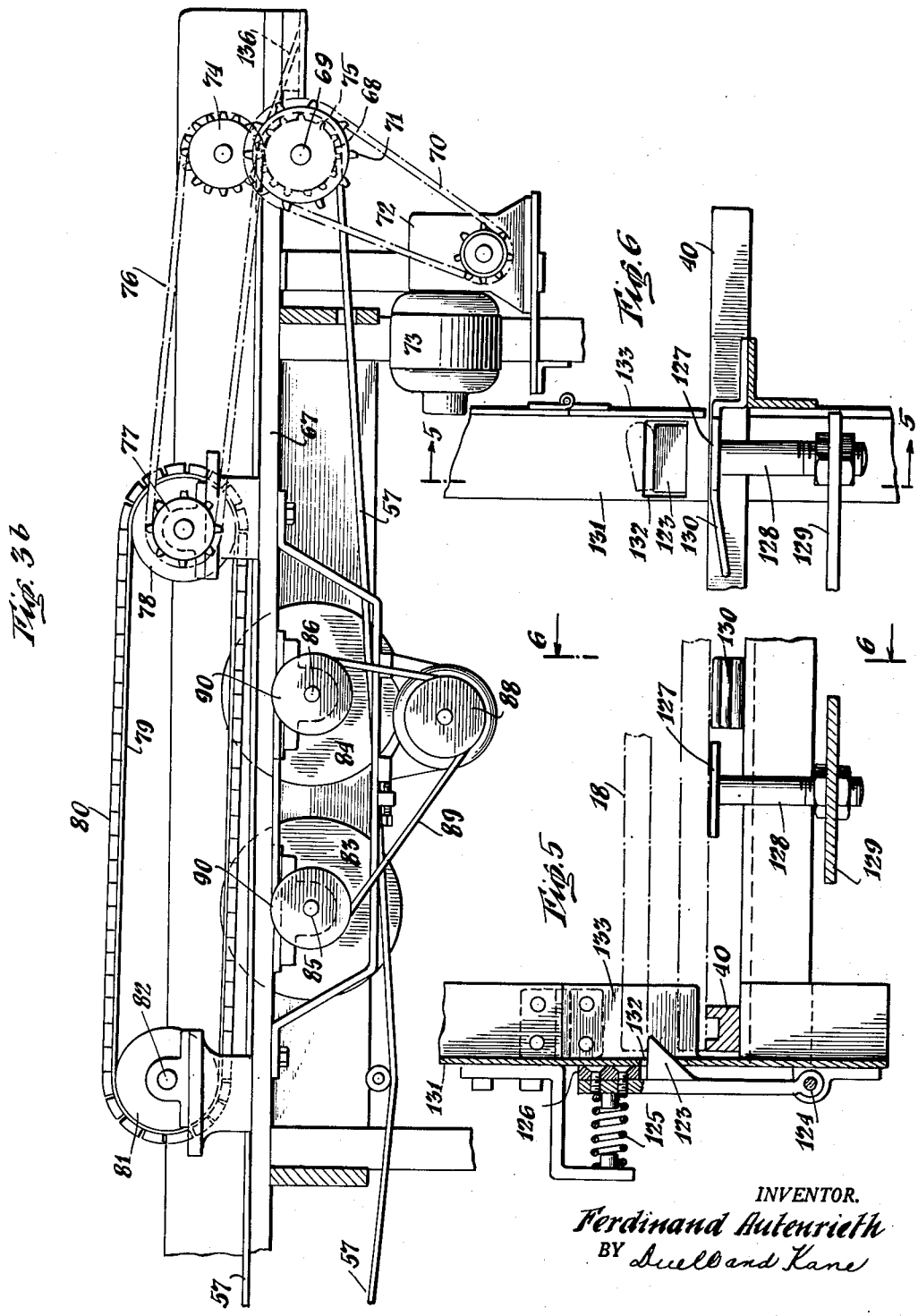

Aug. 18, 1953  F. AUTENRIETH  2,649,056
ALIMENTARY FOOD PRODUCT MACHINE
Filed May 7, 1949  9 Sheets-Sheet 6

INVENTOR.
Ferdinand Autenrieth
BY
Duell and Kane
ATTORNEYS

Aug. 18, 1953　　　F. AUTENRIETH　　　2,649,056
ALIMENTARY FOOD PRODUCT MACHINE
Filed May 7, 1949　　　　　　　　　　　9 Sheets-Sheet 7
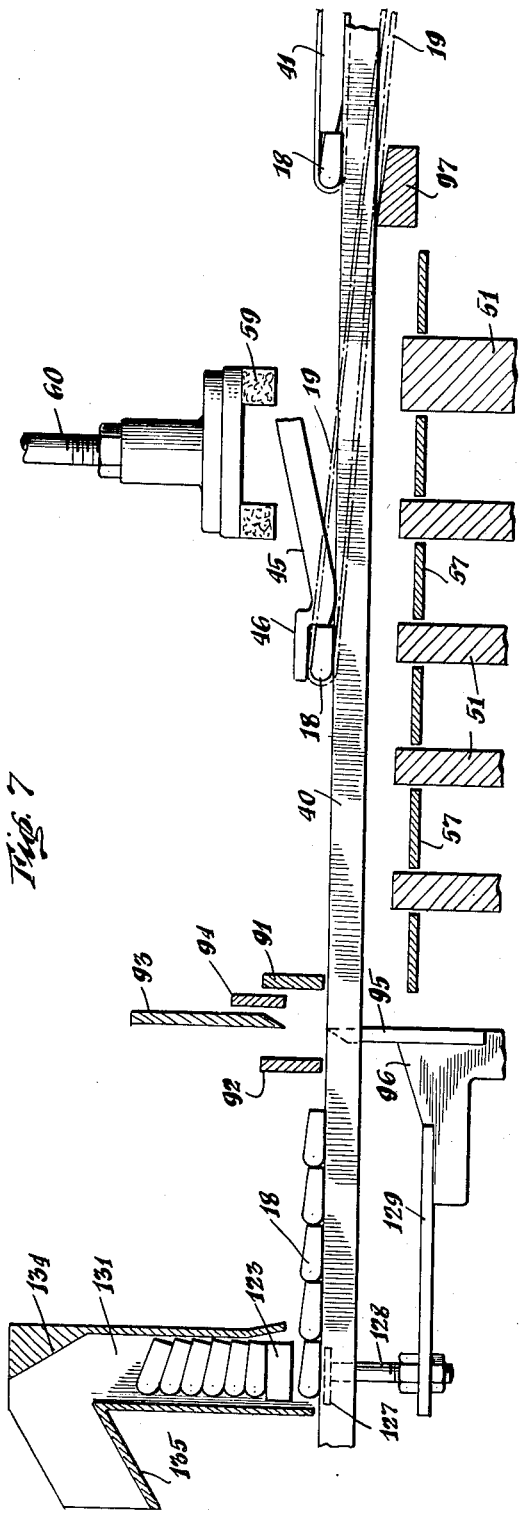
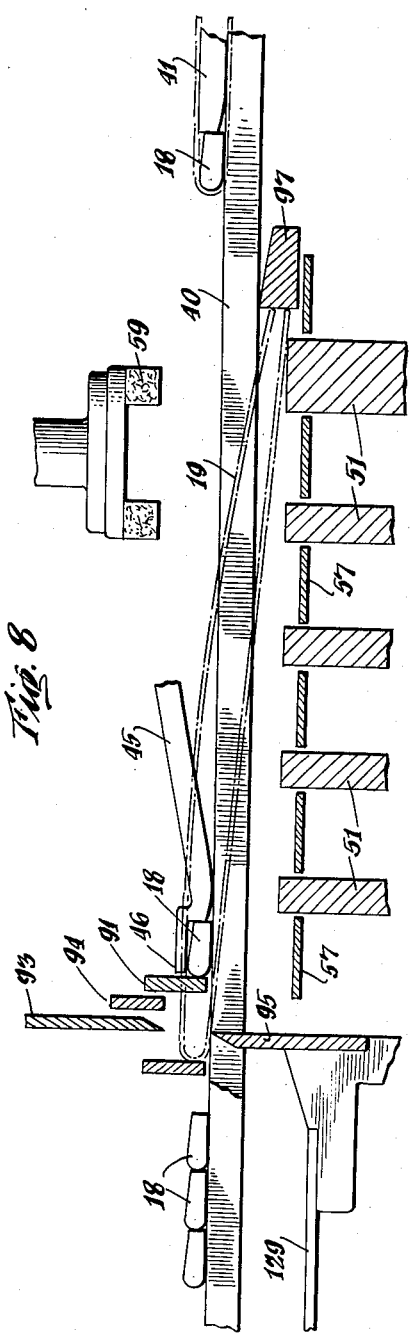
INVENTOR.
Ferdinand Autenrieth
BY
Duell and Kane
ATTORNEYS

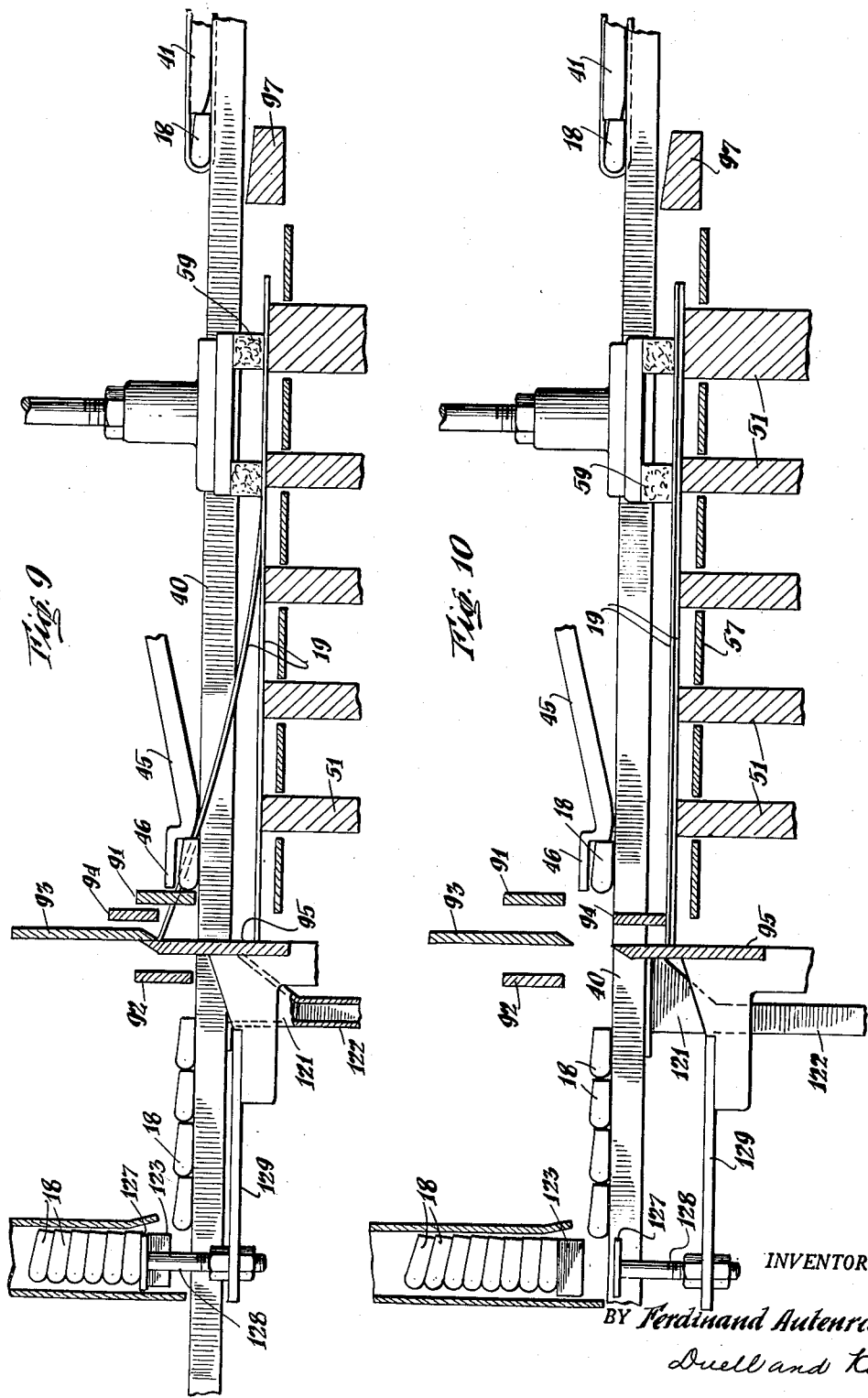

Aug. 18, 1953  F. AUTENRIETH  2,649,056
ALIMENTARY FOOD PRODUCT MACHINE
Filed May 7, 1949  9 Sheets-Sheet 9
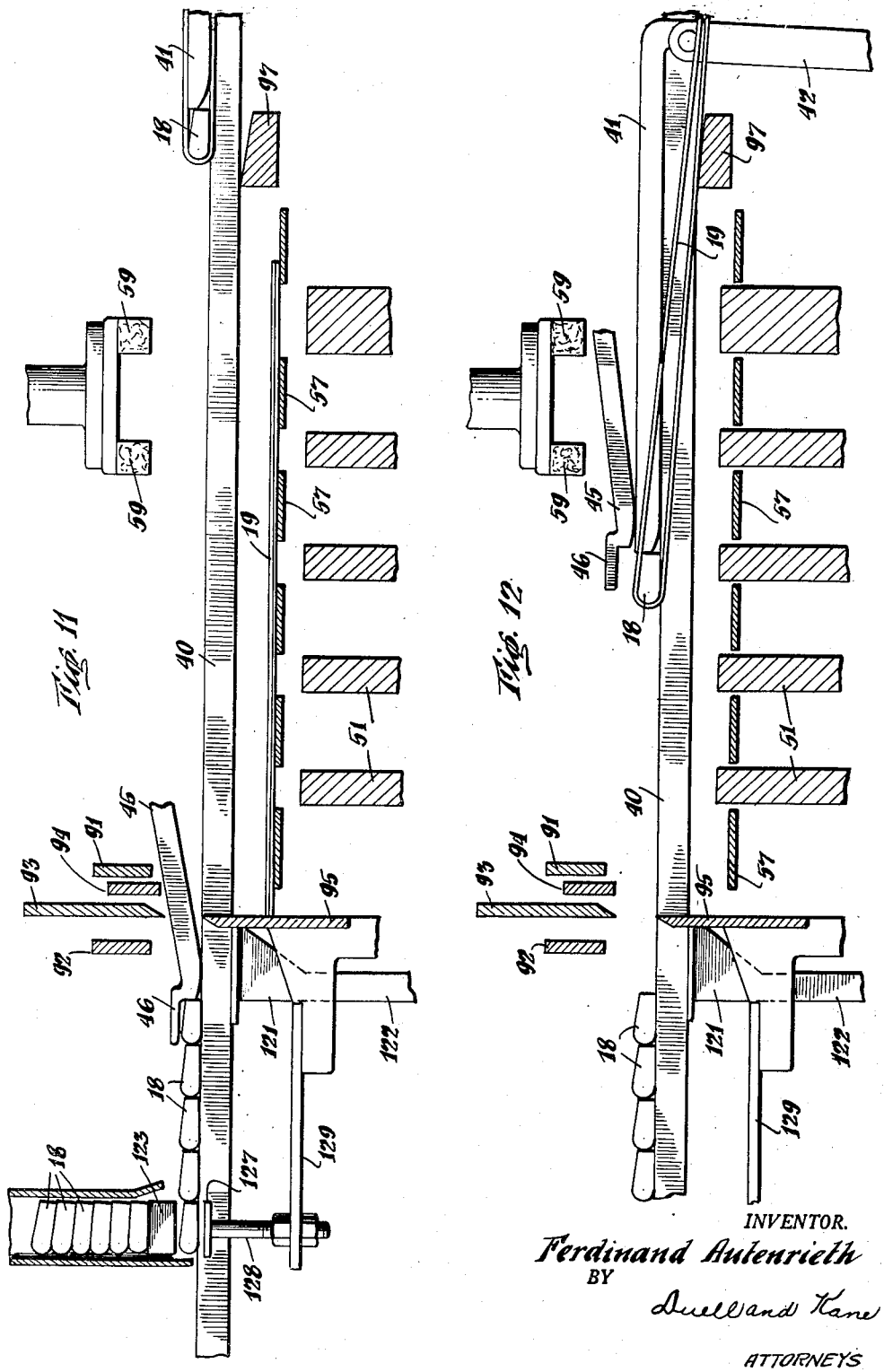
INVENTOR.
Ferdinand Autenrieth
BY
Duell and Kane
ATTORNEYS Patented Aug. 18, 1953

2,649,056

UNITED STATES PATENT OFFICE 2,649,056

ALIMENTARY FOOD PRODUCT MACHINE

Ferdinand Autenrieth, Irvington, N. J., assignor to C. F. Mueller Co., Jersey City, N. J., a corporation of Delaware Application May 7, 1949, Serial No. 91,895

25 Claims. (Cl. 107—21)

This invention relates to a structurally and functionally improved machine for the handling and treatment of alimentary food products, such as spaghetti, macaroni, etc.

It is an object of the invention to furnish an apparatus of this character by means of which long products of the type aforementioned may be transferred from supports such as drying racks and acted upon to furnish substantially uniform lengths which may properly and readily be packaged; the entire operation being capable of achievement with a minimum of manual supervision and no manual contact.

An additional object is that of providing an apparatus of this type which will include comparatively few and rugged parts, such parts being capable of ready assemblage and when so assembled functioning over long periods of time with freedom from all defects and means of replacement.

With these and other objects in mind, reference is had to the attached sheets of drawings illustrating one practical embodiment of the invention, and in which:

Fig. 1 is an elevation of a drying rack and showing the same disposed adjacent a transfer station, embracing what might be termed the entrance part of the machine;

Fig. 2a is a plan view of a portion of the bed of the machine;

Fig. 2b is a similar view of the remainder of the machine;

Fig. 3a is a side elevation of that part of the machine which has been shown in Fig. 2a;

Fig. 3b is a sectional side view of the rear or delivery portion of the machine as illustrated in Fig. 2b;

Fig. 4 is a transverse sectional view taken along the lines 4—4 and in the direction of the arrows as indicated in Fig. 3a;

Fig. 5 is a sectional view taken along the lines 5—5 and in the direction of the arrows as indicated in Fig. 6;

Fig. 6 is a transverse sectional view taken along the lines 6—6 and in the direction of the arrows as indicated in Fig. 5;

Fig. 7 is a somewhat schematic view taken through the body of the machine and illustrating in enlarged scale the parts as especially shown in Fig. 4; and Figs. 8 to 12, inclusive, are views corresponding to Figs. 7, but illustrating the positions which the various parts assume throughout the several stages of the operating cycle.

Figure 4:
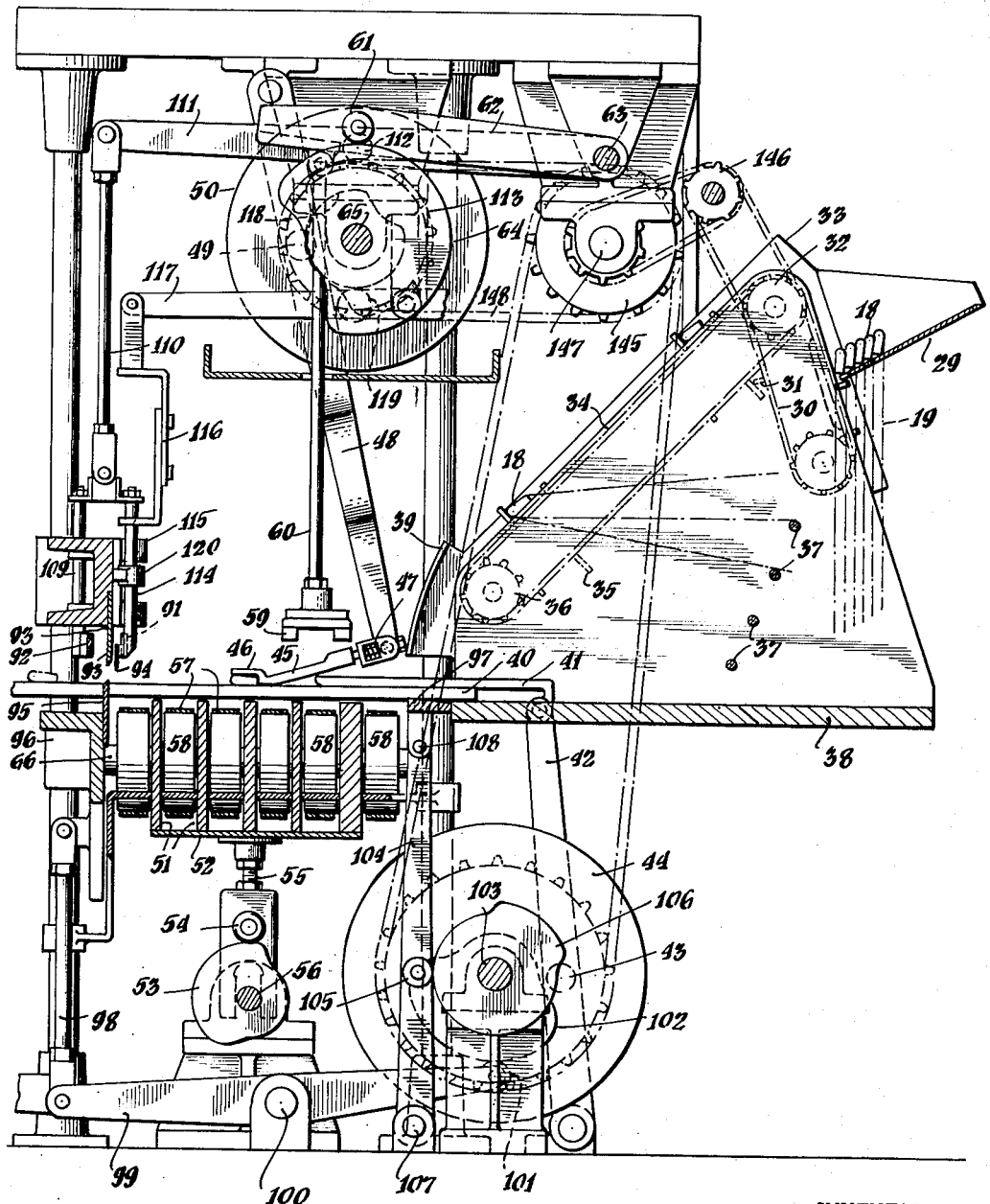

By means of a machine constructed in accordance with present teachings, alimentary food products, commonly termed long goods, and including spaghetti, macaroni, etc., may be operated upon in the space intervening the drying racks or trucks and the packaging department of a factory devoted to the manufacture of food products of the type aforementioned.

The operations herein contemplated will include the transfer of the products from the drying racks (which preferably form parts of mobile trucks) to the machine proper. In that machine the products will be serially advanced and uniformly disposed. Loops or bent portions will be removed from the products. The severed loops will be collected and may either be re-worked or otherwise disposed of. The lengths of food product remaining will be trimmed into substantially uniform lengths and arranged and advanced in proper depth formation. Therefore, they may thereupon be delivered forthwith to suitable packaging machinery which will, for example, dispose a predetermined amount of these products in a proper package, this operation being continued indefinitely.

In Fig. 1, the numerals 15 indicate drying racks which may be supported upon a platform 16, in turn mounted upon rollers or wheels 17. This rack may include four tiers each defined by horizontally extending members. The latter receive rods 18, from which the looped products 19 are suspended. Such a structure is conventional in a factory of the type afore designated, it being understood that the trucks are usually disposed in drying chambers after they have once had mounted upon them the filled rods 18. According to the present invention, it is preferred that at least a pair of machines be utilized and that the space between these machines be sufficient to permit of the movement of a truck therebetween. As will be observed in Fig. 1, the entrance end of one machine has been shown at the left hand side of the view and a fragment of the similar end of a duplicate machine has been indicated in the right hand side of that view.

Within this space or alleyway a lift or elevating apparatus may be disposed. The latter has been diagrammatically indicated as including a platform 20, to the under side of which one or more elevating columns 21 are attached. Side rails or guard portions 22 may be secured to the platform and serve as a guide to prevent the side edges of the truck from overlapping the platform 20. A suitable control mechanism (not shown) will in accordance with conventional technique serve to control the elevation and lowering of the platform 20 and the truck or other rack mounted thereon. That control mechanism will preferably be caused to function in a manner hereinafter brought out.

Still with reference to Fig. 1, it will be seen that adjacent the entrance end of the machine, supporting and transferring members may be disposed. Only one of these for each of the machines is visible in Fig. 1. It will be understood that two or more of these elements will form a part of a single assembly. Preferably, they each include blade-like members 23, which may have a right angular configuration and the lower arms of which are continued as at 24 to be connected to operating shafts 25. The latter are capable of oscillation by being mounted on suitable bearings. A handle 26 is conveniently provided to rock the shaft. As shown, shaft 25 may have secured to it a lever supporting a suitable counterweight. In this manner the operating force necessary to shift handle 26 is minimized. A post, 27, supports an operating mechanism 28 in the form of a follower or button. A cam (not shown) is mounted by the adjacent arm portion 24 and cooperates with this follower. The latter controls the operating mechanism for the lift or hoist. The control will function so that, for example, each time the follower 28 is released from cooperating engagement with the cam of arm 24, the platform 20 will be elevated a distance corresponding to one tier. With the parts arranged as described, the platform 20 will therefore be capable of elevating successively through the distance of three tiers above its normal or lowered position. When the follower 28 is released after the lift is in its most elevated position, then the latter by means of the control 28 or a separate control may be caused to lower to the position shown in Fig. 1.

In any event, it will be understood that when handle 26 is moved in a clockwise manner as shown in Fig. 1, the blades 23 will be introduced into the space occupied by products 19 and below the rods 18. Thereupon, and with the truck suitably lowered, the rods will engage the upper edges of blades 23. If, now, handle 26 is moved in a counterclockwise direction, then the bars or rods will be shifted out of supporting engagement with the horizontal members of the rack and be moved with the blades. Simultaneously, of course, the operating mechanism 28 will be actuated if an automatic control is employed. Otherwise a manual operation of suitable controls will effect the desired elevation and retraction of the platform 20.

A shaft 25 is correlated to the entrance of the machine as defined by spaced, inclined supporting members 29 in a manner such that as the blades 23 reach their left hand limit of movement, as shown in Fig. 1, the rods will transfer from the upper edges of these blades to the inclined supports 29. These supports are spaced a distance slightly less than the overall length of the bar. As shown, they may conveniently be L-shaped in section and opposed to each other. Therefore, the ends of a bar may move in supported relationship over these elements. Adjacent the lower ends of the latter, a conveyor 30 moves. This conveyor embraces two endless members spaced slightly less than the length of a bar. As shown in Fig. 1 it is conveniently connected to other driving mechanisms, for example, conventional chain drives. This conveyor mounts supports 31 and may pass around driving wheels or sprockets 32. It is apparent that with conveyor 30 operating, bars 18 upon the supporting members 29 will be individually and successively elevated. In such movement they will ride between plates 33 and shift to a transfer station at which they are supported by a downwardly and inwardly extending conveyor 34. The latter is provided with stops or rests 35 and is driven by suitable wheels or sprockets, one of which has been indicated at 36. The drive of this conveyor is preferably common with that of conveyor 30. Also it includes two endless members spaced from each other a distance less than the overall length of a bar. It will be understood that the operation of the parts is timed in a manner such that only one of the bars 18 is associated with one pair of stops of either the conveyors 30 or 34.

Still with reference to this portion of the mechanism, attention is invited to Fig. 4. In that view, it will be observed that a series of guide rods 37 are furnished. These rods are arranged in a manner such that the strands of the food product as depending from the bars 18 are supported as these bars are shifted upwardly by the conveyor 30 and then inwardly and downwardly by the conveyor 34. As has been indicated by the dash lines in that view, these strands may contact the uppermost or outermost of these series of rods as they are shifted by conveyor 30. As they move upwardly to the transfer station they will continue to engage the guide thus furnished. They will remain in association with that guide until the bar 18 supporting them has moved to a point adjacent the inner end of the conveyor 34. Thereupon and according to their individual lengths they will successively ride over the lower rods 37 of the series and so come to rest in a substantially horizontal position upon the deck 38 of the machine. A shield 39 may be provided above that deck and adjacent the other end of conveyor 34 so that the successive bars 18 will finally come to rest upon guides or rails 40 at a predetermined point. Under those circumstances, the bar will be slightly elevated due to its ends being supported upon these rails. The looped products will be inclined downwardly to a slight degree and will be mainly supported by the deck.

As is obvious, the conveyors in each instance may form parts of a pair of sprocket chains. It is here to be understood that most portions of the machine likewise embrace a pair of parts, this being especially true of the operating cams. The spacing between supporting parts such as the rails 40 will be just short of the length of the rods or bars 18. These bars have their end portions exposed beyond the supported food products even on the rack 15. Therefore, with the guide 29, the courses of the conveyors 30 and 34 and the rails properly spaced, it is apparent that the bars will be supported in a manner such that no mutilation of the food products will occur.

In order to advance a bar supported by the pair of rails 40, two pairs of shifting units are employed. The rear or first of these rides upon the rails 40 and includes fingers 41. The latter may be pivotally connected to actuating arms 42 supporting followers 43 which cooperate with cams 44. A second pair of shifting units also preferably includes a pair of fingers 45 which may be provided with offset forward contact portions 46 and be resiliently coupled as at 47 to operating arms 48. The latter in common with arms 42 are rockingly supported. These arms 48 mount followers 49 operated by cams 50. The timing and cooperation of these parts will be hereinafter described. As will be understood, if the bars are successively engaged and advanced by the fingers or functionally equivalent units they will be shifted to the view as viewed in Fig. 4.

At such left hand portion of the machine the loop severing station is provided. Beyond this severing station the bars are distributed in a manner hereinafter brought out and so that they may again be used. At a point short of the severing station, food product supporting and conveying mechanisms are provided. These are shown to best advantage in Figs. 2a to 4 inclusive.

As illustrated, especially in those views, a plurality of supports 51 are disposed in positions parallel to each other and extend between the rails 40. The bars or supports 51 extend longitudinally of the machine and are mounted upon a common supporting member 52. Each cam 53 cooperates with a follower 54 which through a preferably adjustable connection 55 serves to elevate and permit a lowering of the support 52. A power shaft 56 driven from a motor 138 through a gear reduction device 139, as hereinafter described, mounts and drives the cams 53. A multiple course conveyor 57 has its upper runs or portions disposed between the several bars 51; the conveyor being supported by rollers 58. As shown with the bars 51 in raised position the conveyor is inoperative in that the goods will be supported in a plane above the upper courses by the edges of the bars 51. However, when support 52 lowers, then the goods will come to rest upon the conveyor and be transported thereby.

During the severing operation hereinafter described it is desirable that the food products be held against displacement. To this end a restraining structure 59 may overlie part of the space or area occupied by the bars 51. Such restraining structure will cooperate with the food products by in effect clamping them against the edges of certain of the bars. However, the degree of pressure employed should be regulated in a manner such that no damage to the product results. To this end the restraining structure may include yielding strips or other elements which will assure the desired results. Rods 60 may be disposed adjacent opposite ends of the assembly 59 to support the latter. A follower 61 is provided for each of the rods 60. These followers are preferably mounted by levers 62 which are pivotally supported as at 63. The upper ends of rods 60 are pivotally connected to levers 62. Cams 64 may serve to drive followers 61 and thus shift the rods 60. These cams are mounted on shaft 65 which shaft may also mount the cams 50. Thus, it is apparent that with shaft 65 rotating the clamping or restraining assembly 59 will be periodically lifted and projected.

As especially shown in Figs. 2a and 3a rollers 58 are mounted upon a shaft 66 adjacent one end of the machine. The conveyors pass around these rollers. In the opposite direction the conveyor strips or belts pass beyond the main body of the machine and may extend in operative relation to a supporting deck 67. Adjacent the outer end of the latter additional rollers 68 are provided for supporting the outer or rear ends of the conveyors. These rollers may be mounted upon rotatably supported shaft 69 which by means of sprocket 71 and a connecting chain 70 may be driven from a reduction gearing contained within a casing 72. That gearing is in turn operated by a motor 73. It is to be understood that with the machine in operation, motor 73 preferably operates continuously to cause the courses of the conveyor to be moved at a substantially constant speed.

This motor may also serve to drive a sprocket 74 by, for example, a gear connection 75 comprising gears on shafts 69 and 69a. Sprocket 74 is encircled by a chain 76 which also encircles a sprocket 77. The latter serves to rotate rollers or pulleys 78 around which conveyor strips 79 extend. These strips mount spaced blocks 80 extending obliquely thereof, as especially shown in Fig. 2b. Disposed at a point suitably in advance of the sprocket 77 and roller 78 are rollers 81 mounted for rotation by a shaft 82. Thus, the carrying strips or conveyors 79 are suitably supported so that the blocks in their lowermost plane of movement extend slightly above the upper courses of conveyors 57, and over the deck 67. Each of the blocks 80 may conveniently include a backing portion formed of a suitable material and a contacting portion formed of a resilient substance such as rubber. In their lower plane of travel they may be spaced from the upper faces of the conveyor courses or strips 57 to an extent such that, for example, three to five thicknesses of products may rest upon the latter and be yieldingly engaged by the outer faces of the blocks 80 without injuring them. By having these blocks extending angularly it is of course apparent that despite their spacing the strands of the food product will not enter these gaps because they will extend substantially at right angles to the longitudinal axis of the machine and direction of travel of the conveyors.

Thus, the blocks 80 will properly maintain the product upon the conveyor strips 57 as the latter shift the product in a right hand direction as viewed in Figs. 2b and 3b. It is to be understood that the blocks 80 move in synchronism with the surfaces of the upper courses of the conveyors 57. Extending upwardly through apertures in deck 67 and between these courses are cutting members such as circular saw blades 83 and 84 mounted upon rotatable shaft 85 and 86. Conveniently these shafts are driven by a power pulley 88 around which a belt 89 may pass; that belt or chain also passing around pulleys 90 secured one to each of the shafts 85 and 86. The blade 83 may extend beyond the outermost conveyor strip 57. Blade 84 may be positioned to extend between the upper courses of the third and fourth strip of this conveyor assembly. It will be apparent that the food product supported transversely of the machine axis and moving longitudinally thereof will thus be cut substantially through the center and also have one of its ends trimmed. In many ways it is preferred to merely employ two saws. It is apparent that any suitable number of saws might be utilized and positioned as desired to sever the product into the required number of sections.

Now referring to the structure disposed at the looped-end severing station and adjacent such station, it will be observed as in Figs. 7 to 12 inclusive that there is disposed adjacent each of the tracks or rails 40 a bar-arresting stop 91. Beyond these stops and between them a product-arresting stop 92 is disposed. Conveniently these stops are interconnected so as to be properly supported and moved. A severing blade 93 is positioned in advance of the stop 92. A wiper bar or member 94 may cooperate with this blade and is mounted in a manner hereinafter brought out. A second blade 95 is disposed below and in line with blade 93. Blade 95 is mounted upon a support 96. At this time it is also to be noted that a feeding bar or member 97 is disposed at a point short of the first of the series of supporting bars 51. Member 97 may be supported for guided movements in any desired manner.

As shown especially in Fig. 4, the mounting 96 may be raised and lowered by a pair of rods 98 which have their ends connected one to each of the outer ends of a pair of beams 99 pivotally supported as at 100. The inner ends of these beams carry followers 101 which cooperate with the tracks or surface of a pair of cams 102 supported upon a shaft 103. This shaft is preferably the same shaft which supports the cams 44. This shaft also serves to shift the feeding member or bar 97. This is achieved by employing a pair of levers 104 each of which mounts a follower 105 cooperating with the surfaces of a pair of cams 106 secured to shaft 103. Cooperating engagement between the cams and followers is maintained in any desired manner. For example, springs (not shown) may be employed. Otherwise a cam track or groove may be utilized and the follower may be disposed in that groove and thus confined against excessive movements. The levers are pivotally supported adjacent their lower ends as at 107 and are connected preferably by pivots 108 adjacent their upper ends with the feed bar 97. Thus, it is apparent that when shaft 103 revolves bar 97 or its equivalent will be reciprocated towards and away from the supporting members or bars 51.

Returning to the loop severing station it will be observed that there is disposed adjacent the same a pair of slidably mounted rods 109. These are reciprocated in guide 115 by rods 110. The latter have their upper ends connected to rockingly supported beams 111 mounting followers 112 cooperating with cams 113. These cams are preferably supported upon the shaft 65 and the inner ends of beams 111 are rockingly supported by the shaft 63. Rods 109 mount the stop 92 which when moved downwardly serves to arrest the product. These rods also move the stop 91 in synchronism with stop 92; stop 91 serving to arrest movement of the bar. Similar rods 114 may movably mount the scraper or member 94 disposed adjacent the blade 93. Suitable guides 115 and 120 are provided for the various bars and rods. A pair of beams 117 is provided one adjacent each end of the machine. Straps 116 connect these beams with bars 114. Followers 119 are mounted by the beams and cooperate with cams 118 mounted by shaft 65. It is thus apparent that as beams 117 rock, the stripper member 94 will be shifted with respect to blade 95. The weight of beams 117, straps 116 and rods 114 is such that the stripper member tends to move upwardly in cooperation with the blade. As beam 111 rocks, it will elevate and depress stops 91 and 92.

Now referring to the sequence of operations occurring at the severing station it will be seen that as illustrated in Fig. 7 the feeder fingers or elements 45 embracing the second pair of shifting members are in engagement with a bar 18 having thereon product 19, thereby feeding this bar together with the product towards the severing station. The feeder elements 41 are in engagement with the ends of a succeeding bar 18. At the moment the latter bar is stationary. It will also be observed that blades 93 and 95 are separated while stops 91 and 92 are in obstructing position in Fig. 7. Additionally, the restraining assembly 59 is in elevated position and does not cooperate with the product 19. The feeding of the bar 18 by the shifting fingers 45 occurs at substantial velocity.

Thus, as shown in Fig. 8, when further movement of this bar is arrested by the stops 91 the inner ends of the product 19 providing the loops or elbows move out of contact with the bar 18 and due to their momentum, continue to shift inwardly until their movements are arrested by the stop 92. In order that any products which have not thus moved, because of adhesion with the bar 18, may be shifted to proper position, the feeding bar 97 is employed. As has been shown the upper face of this member is preferably inclined so that the product 19 will override this face. As the bar 18 is arrested by the stops 91 the ends of the product will be beyond member 97. Therefore if the latter is shifted to the left as viewed in Fig. 8, any strands which have not been moved into substantial contact with the stop 92 will be so moved by the member 97. In this connection it will be understood that no difficulties will be experienced because the strands passing through this machine are baked and therefore relatively rigid.

The parts are now in a position where a severing operation may occur. The mechanism is so timed that at this instant the restraining assembly 59 will lower as shown in Fig. 9 and thus prevent the products from shifting with respect to the supporting bars 51. Immediately thereafter the mounting 96 of blade 95 will elevate. This will cause the looped ends of the product to be severed and such ends will now fall into a trough or receptacle 121 from which a chute 122 may lead into a collecting receptacle (not shown). It is to be remembered that the shifting fingers 45 have their offset end portions 46 remaining in contact with the bar 18 throughout this portion of the operation.

Therefore, as shown in Fig. 10, these shifting fingers may serve to further move the bar when the knives have once separated and the stops 91 and 92 have been elevated. Prior to such further shifting of the bar, however, the stripping or wiping member 94 will have moved downwardly over blade 95 and thus serve to effectively remove from adhering contact with that blade any of the food product.

After this stripping member has elevated as in Fig. 11, the fingers 45 may feed the bar beyond the severing station. At this time the restraining member 59 will also have been elevated. This will be because the food products are no longer under any strain and have dropped to a horizontal position. As will also be apparent from an inspection of Figs. 10 and 11 it is at this instant that the supporting bars 51 will have lowered and the food product will now rest upon the upper courses of the conveyors 57. The upper surfaces of the conveyor strips may be roughened and formed of any suitable material such as leather, plastic, etc. Accordingly with the conveyor moving, the product resting upon the same will now move laterally.

The feeding fingers 41 associated with the next succeeding bar will now shift that bar forwardly or towards the severing station as has been shown in Fig. 12. Simultaneously with this feeding operation the fingers 45 will be retracted to a maximum extent. Under these circumstances they will extend slightly to the rear of the forward end of fingers 41, and will overlap such fingers. Therefore, when fingers 41 now retract to their initial position as shown in Fig. 7, the offset end portions 46 of fingers 45 will engage this next succeeding bar 18 as also shown in that figure. In the cycle of operation intervening the positions shown in Figs. 11 and 12, the supporting bars 51 will again elevate so that they will engage the product 19 as it is shifted forwardly and as heretofore described.

Attention is next invited to Figs. 5 and 6. In those views it will be seen that elevating head 127 may be mounted upon posts 128 in turn supported by mountings 129. The latter are secured to the mounting 96 for the blade 95. Inclined guiding portions 130 may extend into the plane of the elevating members 127. Adjacent the opposite sides of the machine guides 131 may be provided and formed with apertures 132. These guides may also be furnished with hinged flaps 133. Pawls 123 extend through the openings 132. These pawls are pivotally mounted as at 124 and are acted upon by springs 125; it being observed that resilient stops and cushioning elements 126 may be carried by the upper ends of the pawl arms.

Returning now to Fig. 11, it will be remembered that fingers 45 have shifted bar 18 past the severing station and the stops adjacent thereto. In its engagement with preceding bars such shifting will cause the latter to also be moved laterally. In such movement the innermost bar will ride up the inclined guides 130 and come to rest upon the elevating members 127 at a point between the guides 131. As the elevating members are raised the thus supported bar will cam against the latches 123 and ride above the same so as to be supported by the latches as shown in Fig. 5. As the cycle of operation continues, succeeding bars will elevate this first bar and the latter will finally assume a position adjacent the upper ends of the guides 131. At that point, it may cam against the inclined surface 134 (Fig. 7) and be shifted thereby into chute 135 through which it may descend to a suitable receiving trough. In the event it is desired to obtain access to bars adjacent the base of these stacks thus furnished, flaps 133 may be swung so as to expose the lowermost bars of such stacks. They may be conveniently removed should it be desired to do so.

From the foregoing it will be understood that as previously traversed a group of bars with supported food products thereon is transferred from the drying or supporting rack to the machine. These bars are successively elevated and then lowered so that the food products assume a substantially horizontal position. The fingers 41 and 45 now successively advance the bars along the rails 40. In such advance the loop ends of the products are projected beyond the severing station. Thereupon they are severed. The loops are disposed of and the bars which are now empty are properly distributed.

In such severing it is to be noted that any tendency of the food product to adhere to the blades of the knife assembly or to the bar is prevented. The product now moves by means of the conveyor 57 past the saws 83 and 84. In such movements it is restrained from becoming accidentally displaced or shifted by the blocks 86. In traversing this station the product is severed substantially centrally and its ends are trimmed. Thereafter it may be delivered by the conveyor 57 to a conveyor 136 which may pass under the rollers secured to shaft 69. In lieu of the conveyor a packing table, chute or other supporting structure may be provided. In any event, the food product is now received by packaging machinery (not shown) where the trimmed products are disposed in proper receptacles.

Any suitable power source or sources may be employed for providing the main drive of the machine. Conveniently a single motor 138 is employed through a suitable reduction within casing 139 and serves to drive any suitable number of sprockets, gears or similar units. Again as shown, these units may be coupled by chains 141 to driven sprockets 142 and 143. One of these may rotate the shaft 103 while another may turn units or assemblies ensleeved upon this shaft and which are to be rotated at a different speed than that of the shaft. The sprocket 143 may drive a chain 144 in turn driving a sprocket 145 to impart movement to a drive 146 extending to and causing a functioning of conveyors 30 and 34. Sprocket 145 is conveniently keyed to shaft 147 which by means of a drive 148 serves to rotate sprocket 149. The latter is secured to shaft 65 so as to effect rotation thereof. The last described mechanisms serve to indicate the types of drive which may conveniently be employed to impart motion to the several parts so that the latter will function in properly timed relationship. It is apparent that many various forms of drive might be employed to achieve the desired results.

Thus, among others, the several objects of the invention as specifically aforenoted are achieved. Obviously numerous changes in construction and rearrangement of the parts might be resorted to without departing from the spirit of the invention as defined by the claims.

I claim:

1. A machine of the type described including in combination means for conveying bars over which the looped ends of food products are disposed, means causing said products to be displaced with respect to said bars to cause said ends to be spaced therefrom and means for severing the spaced ends of such products at points beyond such bars.

2. A machine of the type described including in combination means for conveying bars over which the looped ends of food products are disposed, means causing said products to be displaced with respect to said bars to cause said ends to be spaced therefrom, further means for shifting such products as have not been completely displaced with respect to the bar supporting the same to cause all of said looped ends to be spaced therefrom and means for severing the spaced ends of such products at points beyond such bars.

3. A machine of the type described including in combination means for conveying bars over which the looped ends of food products are disposed, means causing said products to be displaced with respect to said bars to cause said ends to be spaced therefrom, further means for severing the spaced ends of such products at points beyond such bars and means for separating any products tending to adhere to said severing means.

4. A machine of the type described including in combination means for conveying bars over which the looped ends of food products are disposed, means causing said products to be displaced with respect to said bars to cause said ends to be spaced therefrom, further means for severing the spaced ends of such products at points beyond such bars and further conveying means effective upon the severing operation being completed for removing said products from a point adjacent said severing means.

5. A machine of the type described including in combination means for conveying bars over which the looped ends of food products are disposed, means causing said products to be displaced with respect to said bars to cause said ends to be spaced therefrom, further means for severing the spaced ends of such products at points beyond such bars, further conveying means effective upon the severing operation being completed and removing said products from a point adjacent said severing means and product-dividing means disposed adjacent said further conveying means.

6. A machine of the type described including in combination means for conveying bars over which the looped ends of food products are disposed, means causing said products to be displaced with respect to said bars to cause said ends to be spaced therefrom, further means for severing the spaced ends of such products at points beyond such bars, further conveying means effective upon the severing operation being completed and removing said products from a point adjacent said severing means and product-trimming means disposed adjacent an edge of said further conveying means and cooperating with said products as the latter are transported by such further conveying means.

7. A machine of the type described including in combination means for conveying bars over which the looped ends of food products are disposed, means causing said products to be displaced with respect to said bars to cause said ends to be spaced therefrom, further means for severing the spaced ends of such products at points beyond such bars, and means receiving the severed looped ends of such products.

8. A machine of the type described including in combination means for conveying bars over which the looped ends of food products are disposed, means causing said products to be displaced with respect to said bars to cause said ends to be spaced therefrom, further means for severing the spaced ends of such products at points beyond such bars and means for shifting said bars from between the remaining portions of the severed products to a point beyond said severing means after the latter has functioned.

9. A machine of the type described including in combination means for conveying bars over which the looped ends of food products are disposed, means causing said products to be displaced with respect to said bars to cause said ends to be spaced therefrom, further means for severing the spaced ends of such products at points beyond such bars and means for holding said products against movement during such severing operation.

10. A machine of the type described including in combination means for conveying bars over which the looped ends of food products are disposed, means causing said products to be displaced with respect to said bars to cause said ends to be spaced therefrom, further means for severing the spaced ends of such products at points beyond such bars, further conveying means effective after operation of said severing means to move the food products away from the latter, additional severing means cooperating with said products while so moved by said further conveying means and displacement preventing means cooperating with such products while on said further conveying means and during said latter severing operation.

11. A machine of the type described including in combination means for conveying bars over which the looped ends of food products are disposed, means for arresting the movements of said bars to cause a displacement of said products with respect to the same such that said looped ends are shifted to be spaced from contact with said bars and means for severing the projecting looped portions of the thus displaced products.

12. A machine of the type described including in combination means for conveying bars over which the looped ends of food products are disposed, means for arresting the movements of said bars to cause a displacement of said products with respect to the same such that said looped ends are shifted to be spaced from contact with said bars, further means for positively shifting any products which are not thereby displaced relative to the bars to displace them with respect to the bars to which they may be tending to adhere whereby all of said looped ends will extend beyond and be spaced from a bar supporting them and means for severing the projecting looped portions of the thus displaced products.

13. A machine of the type described including in combination means for conveying bars over which the looped ends of food products are disposed, means for arresting the movements of said bars to cause a displacement of said products with respect to the same such that said looped ends are shifted to be spaced from contact with said bars, means for severing the projecting looped portions of the thus displaced products and means for limiting the displacement of said products with respect to said bars.

14. A machine of the type described including in combination means for conveying bars over which the looped ends of food products are disposed, movable means for transferring a series of said bars from a substantially stationary rack member to said conveying means, means for causing said products to be displaced with respect to said bars whereby the looped ends of said products extend beyond and are spaced from said bars and means for severing the displaced looped ends of such products.

15. A machine of the type described including in combination means for conveying bars over which the looped ends of food products are disposed, movable means for transferring a series of said bars from a substantially stationary rack member to said conveying means, means for causing said products to be displaced with respect to said bars whereby the looped ends of the products extend beyond and are spaced from said bars, means for severing the displaced looped ends of such products and receiving means for a plurality of such bars disposed beyond said severing means.

16. A machine of the type described including conveying means for food products presenting looped end portions, means to sever such end portions, means to arrange such end portions in proper relationship with respect to said severing means and means operating during the functioning of said severing means to prevent a displacement of said products with respect to the latter.

17. A machine of the type described including conveying means for food products presenting looped end portions, means to sever such end portions, means to arrange such end portions in proper relationship with respect to said severing means, further conveying means effective upon severance of such end portions to remove the products from a point adjacent said severing means and additional product severing means disposed in operative relationship with respect to said further conveying means.

18. A machine of the type described including in combination means for conveying bars for receiving food products looped thereover, means causing said products to be displaced with respect to said bars whereby the looped portions of the products extend beyond and are spaced from said bars, means for severing the spaced ends of such products and means operating after the functioning of said severing means to sequentially shift said bars from between the remaining portions of the severed products to points beyond the same and means for stacking the bars.

19. A machine to operate on food products, the bodies of which are looped over supporting bars, said machine comprising means for conveying bars with food products thereon in a direction substantially transverse to the bar axis and parallel to the food products, means for supporting said products so moved in a substantially horizontal plane, means for severing the products at points adjacent said bar to remove the looped end portions thereof, means for transferring the bars from which the products have been severed, movable conveying means disposed below said products and adjacent said supporting means and means for effecting a transfer of said products from said supporting means to said conveying means.

20. A machine to operate on food products, the bodies of which are looped over supporting bars, said machine comprising means for conveying bars with food products thereon in a direction substantially transverse to the bar axis and parallel to the food products, means for supporting said products so moved in a substantially horizontal plane, means for severing the products at points adjacent said bar to remove the looped end portions thereof, means for transferring the bars from which the products have been severed, movable conveying means disposed below said products and adjacent said supporting means, means for assuring a detachment of said products from said severing means, and means for effecting a transfer of said products from said supporting means to said conveying means.

21. A machine to operate on food products, the bodies of which are looped over supporting bars, said machine comprising means for conveying bars with food products thereon in a direction substantially transverse to the bar axis and parallel to the food products, means for supporting said products so moved in a substantially horizontal plane, means for severing the products at points adjacent said bar to remove the looped end portions thereof, means for transferring the bars from which the products have been severed, movable conveying means disposed below said products and adjacent said supporting means, means for assuring a substantial registration of all of the looped ends of such products with respect to each other prior to the operation of said severing means, and means for effecting a transfer of said products from said supporting means to said conveying means.

22. A machine to operate on food products, the bodies of which are looped over supporting bars, said machine comprising means for conveying bars with food products thereon in a direction substantially transverse to the bar axis and parallel to the food products, means for supporting said products so moved in a substantially horizontal plane, means for severing the products at points adjacent said bar to remove the looped end portions thereof, means for transferring the bars from which the products have been severed, movable conveying means disposed below said products and adjacent said supporting means, means for maintaining said products against displacement with respect to said supporting means during the severing operation, and means for effecting a transfer of said products from said supporting means to said conveying means.

23. A machine for operating on food products looped over and supported by bars, said machine comprising means for shifting said bars, means for supporting the products in a substantially horizontal plane during such shifting, means for arresting the shifting of said bars, said machine providing a space for the reception of looped end portions of the products displacing under momentum with the arrest of said bars to a point where such looped ends are spaced beyond said bars and severing means disposed at a point beyond the point of arrest of said bars to cut the looped end portions of the products spaced beyond a bar.

24. A machine for operating on food products looped over and supported by bars, said machine comprising means for shifting said bars, means for supporting the products in a substantially horizontal plane during such shifting, means for arresting the shifting of said bars, said machine providing a space for the reception of looped end portions of the products displacing under momentum with the arrest of said bars to a point where such looped ends are spaced beyond said bars, severing means disposed at a point beyond the point of arrest of said bars to cut the looped end portions of the products spaced beyond a bar and further means for preventing movement of the displaced looped ends beyond a predetermined point.

25. A machine for operating on food products looped over and supported by bars, said machine comprising means for shifting said bars, means for supporting the products in a substantially horizontal plane during such shifting, means for arresting the shifting of said bars, said machine providing a space for the reception of looped end portions of the products displacing under momentum with the arrest of said bars to a point where such looped ends are spaced beyond said bars, severing means disposed at a point beyond the point of arrest of said bars to cut the looped end portions of the products spaced beyond a bar and means functioning prior to the operation of said severing means for substantially aligning the looped ends of all of said products.

FERDINAND AUTENRIETH.

References Cited in the file of this patent

UNITED STATES PATENTS

| Number | Name | Date |
| --- | --- | --- |
| 776,485 | Baker | Dec. 6, 1904 |
| 1,029,059 | Gammel | June 11, 1912 |
| 2,223,352 | De Francisci | Dec. 3, 1940 |